United States Patent [19]
Shaw et al.

[11] Patent Number: 5,310,026
[45] Date of Patent: May 10, 1994

[54] ELECTRIC DRUM BRAKE

[75] Inventors: Schuyler S. Shaw, Dayton; Donald E. Schenk, Vandalia; Linda L. Hallinan, Centerville, all of Ohio; Jerry L. Newton, Richmond, Ind.

[73] Assignee: General Motors Corporation, Detroit, Mich.

[21] Appl. No.: 963,179

[22] Filed: Oct. 19, 1992

[51] Int. Cl.$^5$ .............................................. B60T 13/74
[52] U.S. Cl. ...................................... 188/156; 188/158
[58] Field of Search ............... 188/156, 157, 162, 325, 188/328, 331

[56] References Cited

U.S. PATENT DOCUMENTS

| | | | |
|---|---|---|---|
| 4,678,067 | 7/1987 | Thompson | 188/328 |
| 5,000,297 | 3/1991 | Shaw et al. | 188/156 |
| 5,150,773 | 9/1992 | Hickey et al. | 188/162 |
| 5,152,588 | 10/1992 | Bright et al. | 188/162 |
| 5,219,049 | 6/1993 | Unterborn | 188/156 |

*Primary Examiner*—Robert J. Oberleitner
*Assistant Examiner*—Chris Schwartz
*Attorney, Agent, or Firm*—Ernest E. Helms

[57] ABSTRACT

A drum brake is provided which in a preferred embodiment includes a backing plate having an anchor at a first end, first and second brake shoes pivotally mounted with respect to the anchor, a nonrotative nut mounted for linear motion with respect to the backing plate, a first apply lever pivotally mounted with respect to the nut and with respect to the first brake shoe, a second apply lever pivotally mounted with respect to the backing plate and with respect to the secondary brake shoe, a first strut pivotally mounted with the first and second brake shoes, a power screw threadably engaged with the nut for translating the nut, and an electric motor torsionally associated with the power screw for turning the same.

8 Claims, 5 Drawing Sheets

ELECTRIC DRUM BRAKE

FIELD OF THE INVENTION

The field of the present invention is that of drum brakes. More particularly, the field of the present invention is that of electrically-actuated vehicle drum brakes.

DISCLOSURE STATEMENT

The present invention provides an electrically-actuated drum brake which is an alternative to that which is shown and described in commonly assigned U.S. Pat. No. 5,000,297. The present invention is particularly useful when utilized in electrically-actuated drum brakes utilizing a parking brake mechanism as that shown and described in Unterborn U.S. Ser. No. 07/720,087 filed Jun. 24, 1991, now U.S. Pat. No. 5,219,049, the disclosure of which is hereby incorporated by reference herein.

To minimize the size of the electric motor utilized in an electrically-actuated rear brake, a duo-servo design has been developed. Duo-servo drum brakes typically have a high torque output. In duo-servo type brakes, a fixed anchor is provided on a backing plate which is connected with the vehicle via a steering knuckle or mounting on the axle housing. In a nonactuated position, forward and rear brake shoes abut an anchor. At the brake show ends opposite the anchor, the brake shoes abut an intervening adjuster strut. When the duo-servo brake is engaged, the primary or leading shoe separates from the anchor (the designation of leading shoe is dependent upon the rotation of the vehicle wheel) and pushes against the secondary shoe via the adjuster strut. In most cases where the anchor is at the top of the backing plate and the adjuster strut is at the bottom of the backing plate and wherein the car is moving forward, the primary designated shoe will be the shoe towards the front end of the vehicle. The primary shoe will separate from the anchor rotating with the wheel pushing on the adjuster strut, which will then push on the secondary shoe which will be grounded at its opposite end on the anchor, giving the brake shoes a duo-servo wrapping motion. An example of a duo-servo brake is provided in U.S. Pat. No. 4,061,429 commonly assigned.

In typical hydraulically-actuated duo-servo brakes, the leading brake shoe will disengage from the anchor when the brake is applied. When the vehicle operator is going up an incline and then decides to park the vehicle, the operator typically initially steps on a brake pedal, causing a wheel cylinder to push the leading shoe to engage the drum and separate from the anchor. Thereafter, the parking brake will be applied via a parking brake lever connected with a cable. When the vehicle operator removes their foot from the brake pedal, the wheel cylinder will collapse. The car's weight will attempt to make the brake drum rotate in a direction to bring the primary brake shoe back into contact with the anchor. However, the tension in the parking brake cable is sufficient to keep the parking brake lever in a position to keep the primary brake shoe wrapped with the drum and separated from the anchor. Therefore, the car remains stationary, even though the pistons of the wheel cylinder are no longer forcing the brake shoes outward.

In an electrically-actuated drum brake, it is desirable that the parking brake mechanism work through the normal service brake actuating mechanism; therefore, the typical cable lever arrangement for the parking brake is deleted. Therefore, if an electrically-actuated duo-servo brake is utilized, there must be provided means to ensure the engagement of the leading shoe with the wheel drum whenever the parking brake is initially engaged when the vehicle is on an incline with the vehicle operator having their foot on the normal service brake pedal.

SUMMARY OF THE INVENTION

To allow the utilization of a duo-servo type brake which is electrically actuated without the use of a mechanical cable retention parking mechanism, the present invention is brought forth.

DETAILED DESCRIPTION OF THE INVENTION

Figure 1:
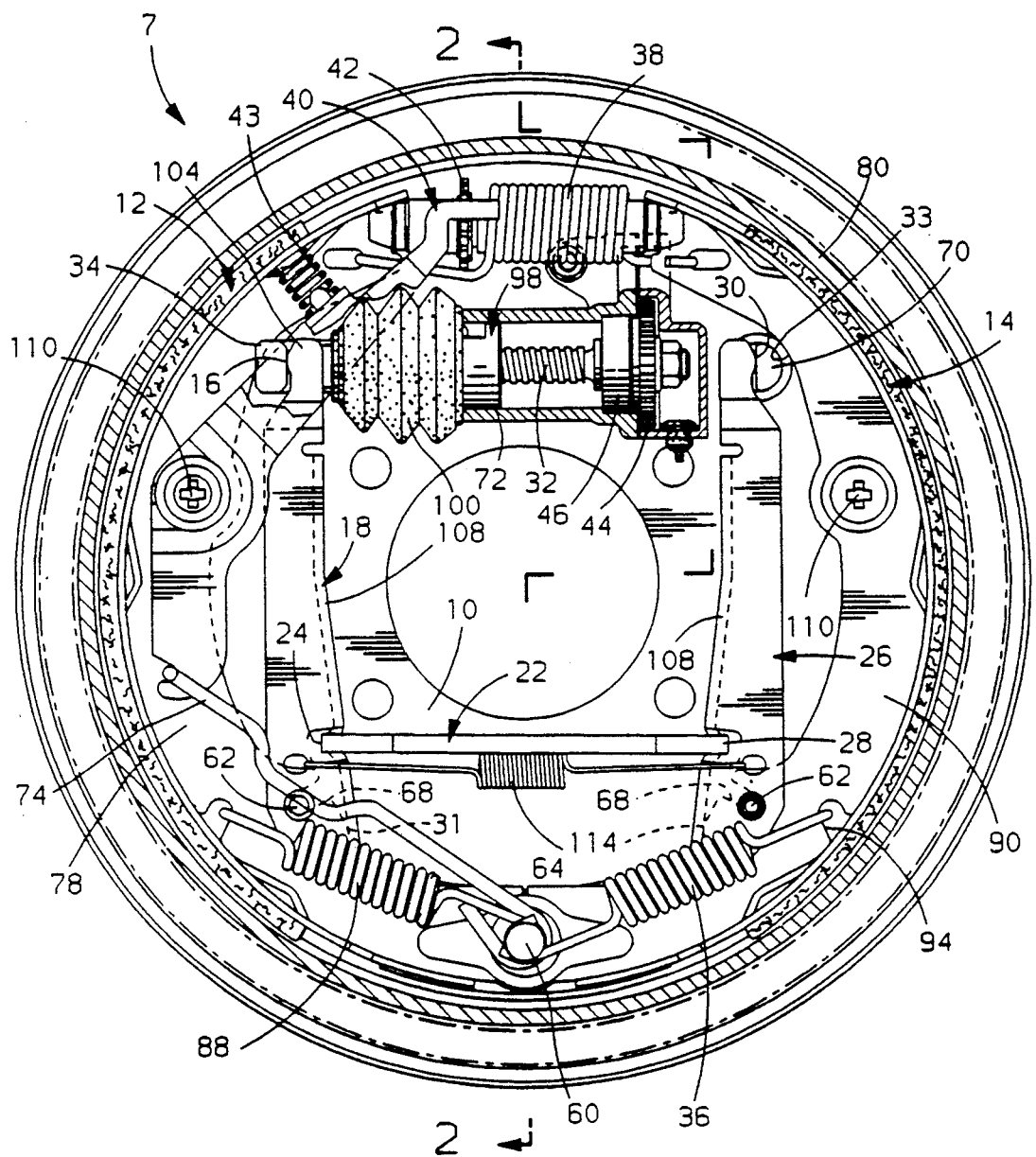
FIG. 1 is a front elevational view of a preferred embodiment of the present invention.
Figure 2:
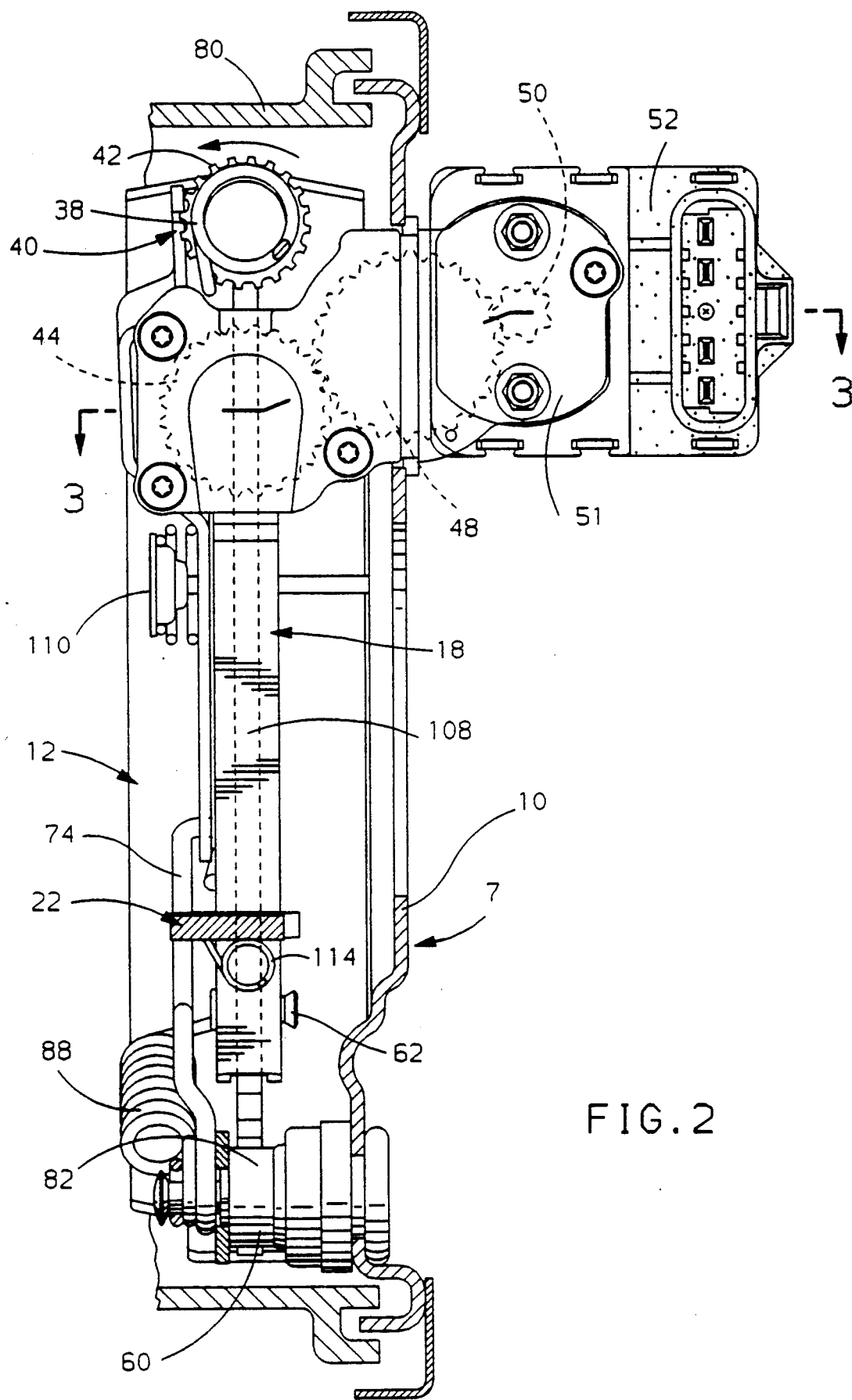
FIG. 2 is a view taken along line 2—2 of FIG. 1.
Figure 3:
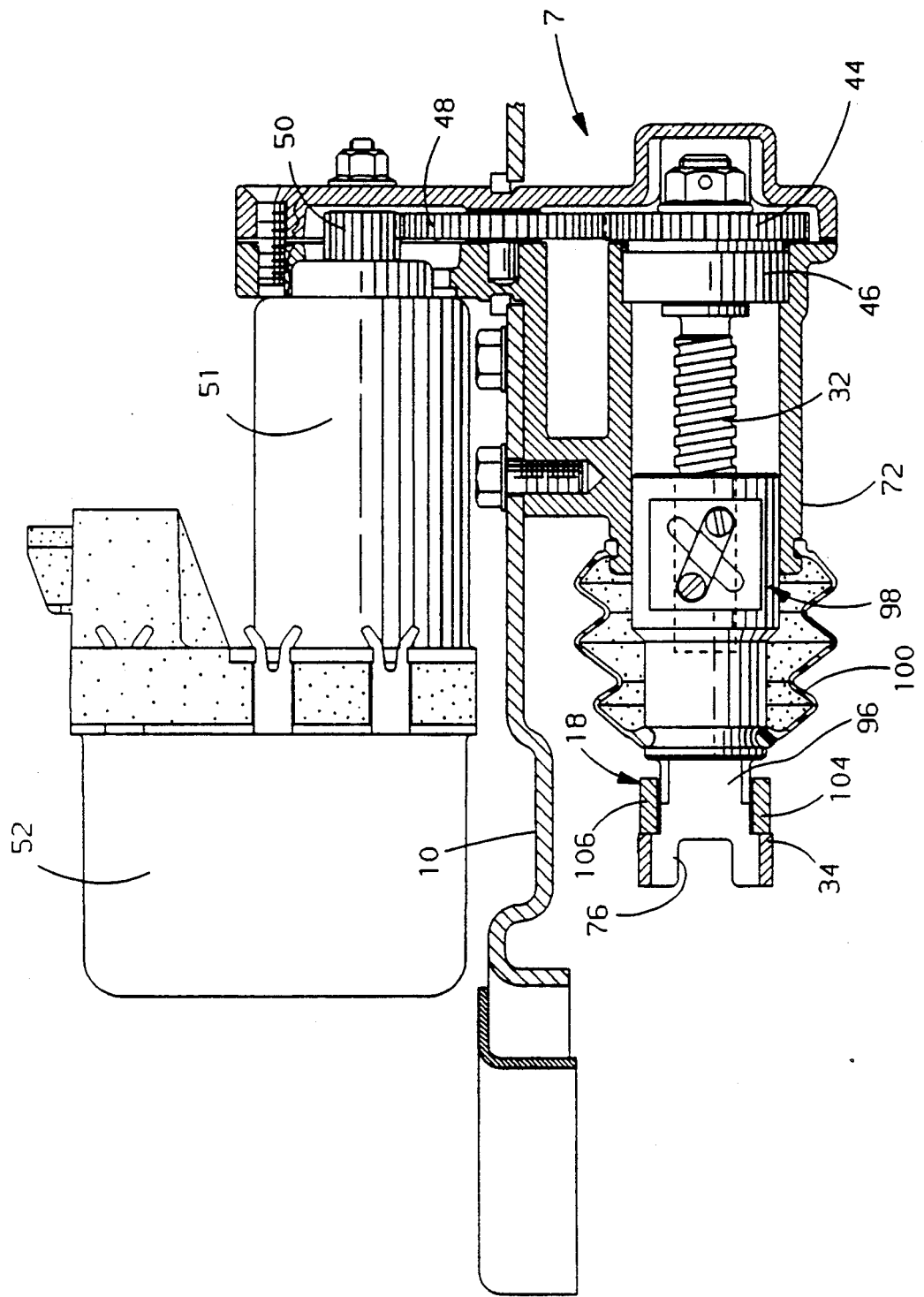
FIG. 3 is a view taken along line 3—3 of FIG. 2.
Figure 4:
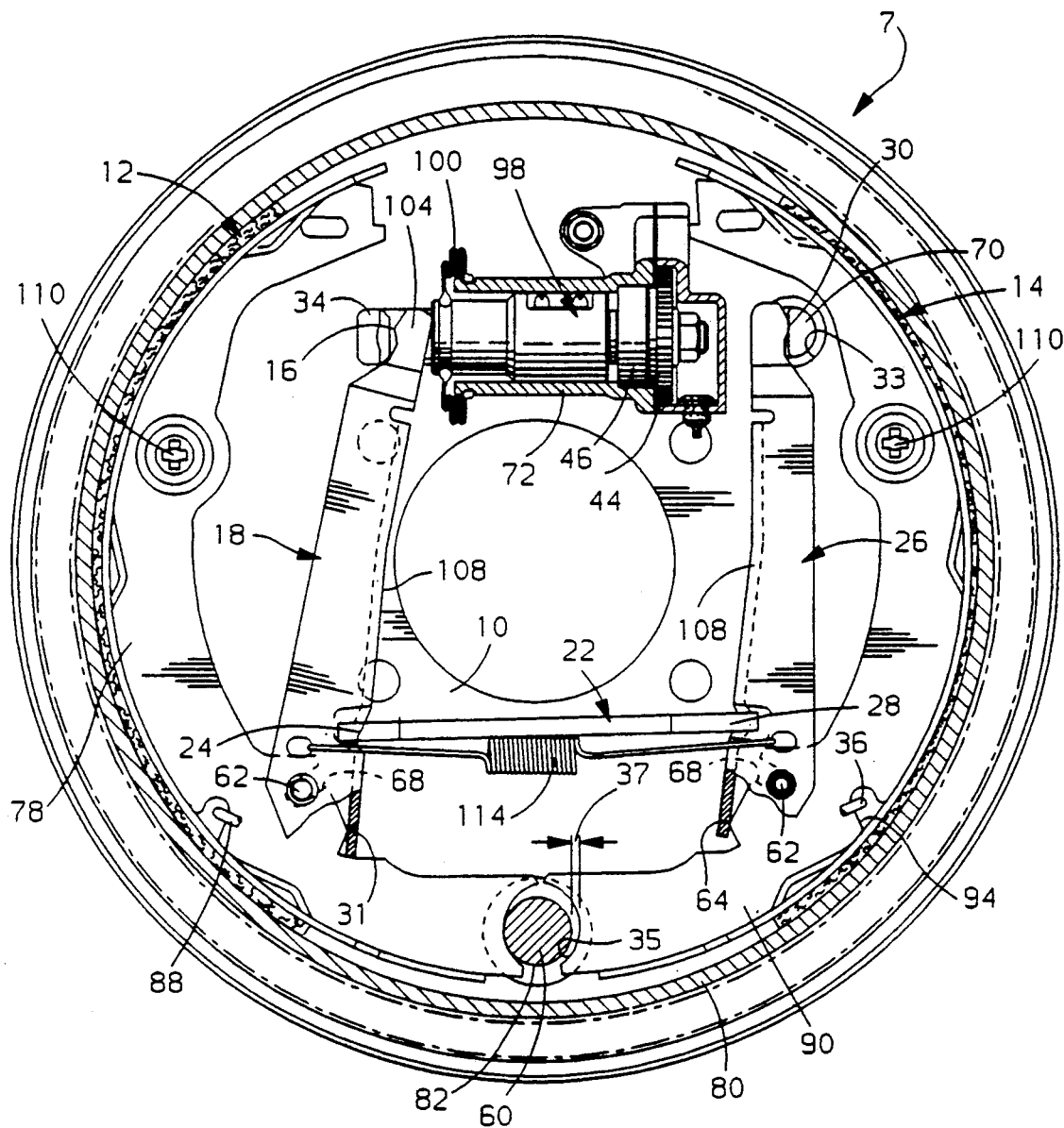
FIG. 4 is an operational view similar to that of FIG. 1 with portions removed for clarity of illustration.
Figure 5:
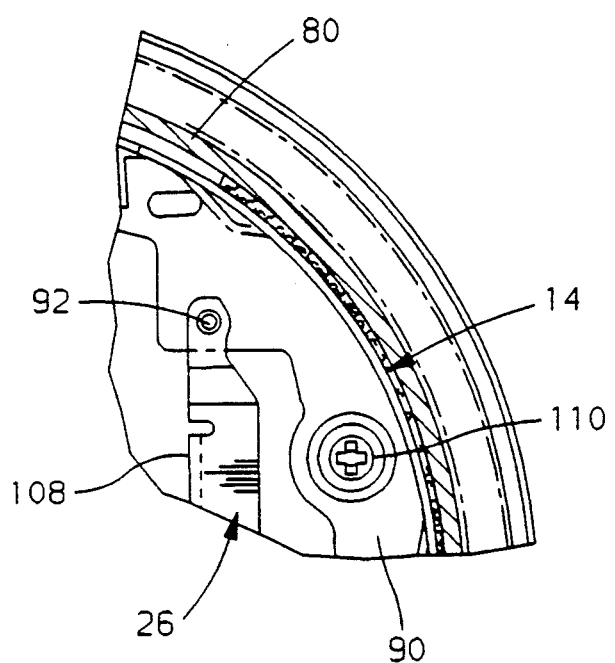
FIG. 5 is a partial view of another vehicle brake.

Referring to FIGS. 1 through 5, the present inventive brake 7 in its preferred embodiment has a backing plate 10 which is connected to the vehicle wheel steering knuckle or axle housing (not shown). Fixably connected to the backing plate 10 is an anchor 60. The anchor 60 has a generally cylindrical surface 82 which provides a contact point for a pair of brake shoes 12, 14. As shown, the forward direction for the vehicle is to the left; therefore, the brake shoe 14 is the leading (sometimes referred to as primary) brake shoe when the vehicle is restrained when traveling in the forward direction. The leading brake shoe 14 has a web 90 which mates with the surface 82 and is in the rest position spring biased towards the surface 82 by a return spring 36 which hooks into a slot 94 of the leading shoe. The leading shoe has a line generally oriented in a plane perpendicular to the web 90 for engagement with the drum (shown sectioned as item 80). The drum 80 is fixably attached with the vehicle wheel.

The leading brake shoe 14 is joined with an opposing trailing brake shoe 12 (commonly referred to as secondary) by an adjuster strut and star wheel combination 42. The ends of the brake shoes 12 and 14 adjacent the adjuster strut 42 are also urged together by a spring 38. Additionally, the brake shoe 12 is urged towards the anchor 60 by a spring 88. To power the brake 7 for actuation, there is provided a motor 51 having a pinion gear 50 attached to a shaft (not shown). The pinion gear 50 powers an idler gear 48, which is in turn engaged with a drive screw gear 44. The drive screw gear 44 is torsionally connected with a drive screw 32. The drive screw 32 is mounted within a housing 72 by a thrust bearing 46. Threadably engaged upon the drive screw 32 is a ball nut 98. The ball nut 98 is slidably mounted within the housing 72 (the housing 72 is fixably connected by suitable fasteners or connective means with the backing plate 10) and is protected at one end by a dust boot 100. One end 96 of the nut 98 has a forked end 76 with flanges 34.

The nut 98 is constrained from rotation by a first lever 18 which has leaves 104 and 106. Each first lever leaves 104, 106 have a pivotal mounting point 16 with the flanges 34. At a lower end, the first lever 18 has a projecting pin 62 which fits within a slot 68 of the brake shoe 12. However, the pivotal contact between the first lever 18 and the brake shoe 12 is accomplished at point 31 (FIG. 4) wherein a web 108, which joins the two leaves 104 and 106, makes contact with an edge 31 formed on the web 78 of the brake shoe 12.

To provide for adjustment of the adjuster strut 42 to compensate for lining wear of the brake shoes 12 and 14, there is provided a pivoting adjustment pawl or arm 40. Adjustment arm 40 is pivotally mounted to the brake shoe 12 for engaging with the star wheel of the adjuster strut 42 in a manner well known in the art. Adjuster arm ball spring 43 and link 74 cooperate in a manner well known in the art to move the adjuster arm.

The backing plate has an aperture 33, and inserted therein is a stud 70. The stud 70 provides a point 30 of pivotal attachment or contact of a second lever 26 with the backing plate 10. [Note: In an example of a brake shown in FIG. 5, the second lever may be pivotally connected with the first shoe 14 near the top end of the shoe 14 via a pin 92. However, that arrangement would lower torque gain in the reverse direction since the strut 22 would act directly on the second lever 26 rather than through a lever ratio of strut-to-abutment (29-31): strut-to-shoe contact (28-64).] The second lever 26 in similar fashion has a projecting pin 62 mounted within a slot 68 of the first brake shoe 14 and has pivotal contact with the first brake shoe at point 64 via a lever web 108. Hold down pins 110 in a manner well known in the art keep the brake shoes 14 and 12 attached with the brake drum 10.

Held in tension between the first lever 18 and the second lever 26 is a strut member 22. The strut 22 at points 24 and 28 has pivotal engagement with the first and second levers 18 and 26. A spring 114 tensions the levers to ensure engagement with the strut 22.

To actuate the brake, the motor 51 via the gear train of gears 50, 48 and 44 turns the drive screw 32, causing the nut 98 to be pulled towards the bearing 46. The movement of the nut 98 causes a force impartation to the first lever 18 via its pivotal engagement of point 16, causing an impartation of force resulting in the brake shoe 12 being pushed outwardly into the brake drum 80. Simultaneously via the strut 22, the first lever 18 will impart a pushing force on the second lever 26 in such a manner to cause the brake shoe 14 to pivot outwardly, engaging the brake drum 80 and causing an end 35 of the shoe to separate from the anchor 60 by a gap 37. Movement of the brake shoe 14 will push the adjuster strut 42 leftward and transmit force to the brake shoe 12, which is grounded by the anchor 60, thereby providing a duo-servo action. The above-noted gap 37 will exist if the brake 7 is actuated when the vehicle is braked on a level surface or when the vehicle is going uphill.

The vehicle operator typically will then engage the parking brake mechanism shown schematically as item 52, which effectively locks the shaft of the motor 50 and its associated pinion gear 50 from further rotation. A more detailed explanation of the workings which locks the electric motor rotor from rotation can be found by review of Unterborn. If the vehicle is parked on a hill, gravity will urge the drum 80 to rotate in a reverse direction (clockwise as shown in FIG. 1) so that the frictional engagement between the brake shoe 14 and the brake drum is lessened by movement of the brake shoe 14 clockwise to close the gap 37. The movement of the brake shoe 14 to close the gap 37 will be resisted by virtue of the parallelogram formed by the drive screw 32 and nut 98, first and second levers 18, 26 and strut 22. The strut 22 is kept in tension and therefore maintains the brake shoe 14 in an engaged position with the brake drum 80.

The points of pivotal connection of the first lever 18 at 16 with the nut 98 and at 24 with the strut 22 and at 62 with the brake shoe 12 are generally collinear, and in like manner, the pivotal points 30, 28 and 64 of the second lever 36 are collinear. The collinear relationship has been found to be more efficient in providing maximum force transmittal of the brake shoes 12, 14 outward for the torque exerted by the power screw 32.

While an embodiment of the present invention has been explained, it will readily be apparent to those skilled in the art of the various modifications which can be made to the present invention without departing from the spirit and scope of this application as it is encompassed by the following claims.

We claim:

1. A drum brake for a wheel of an automotive vehicle comprising:
   a brake drum for connection to the vehicle wheel;
   a backing plate for connection to the vehicle;
   first and second brake shoes with means of pivotal mounting with respect to the backing plate for frictionally engaging the brake drum;
   a first threaded member mounted for linear motion with respect to the backing plate;
   a primary apply lever with means of pivotal mounting with respect to the first threaded member and with means of pivotal mounting with respect to the first brake shoe for imparting an actuation force to the first brake shoe;
   a secondary apply lever having one end with means of pivotal mounting with respect to the backing plate and a second end with means of pivotal mounting with respect to the second brake shoe for imparting an actuation force to the second brake shoe;
   a generally fixed-length strut with means of mounting with respect to and extending between the primary and secondary apply levers for imparting an actuation force from the primary lever to the secondary lever;
   a second threaded member threadably engaged with the first threaded member for translating the first threaded member to impart an actuation force to the primary lever to effect both a service brake and a parking brake application;
   electric motor means for driving the second threaded member; and
   means providing for torsionally restraining motion of the second threaded member.

2. A brake as described in claim 1 wherein the strut has slotted engagement with the primary and secondary levers.

3. A brake as described in claim 1 wherein the first and second shoes are pivotally mounted with respect to the backing plate by abutting pivotal movement with a common anchor fixed to the backing plate.

4. A brake as described in claim 1 wherein there is pivotal mounting of the strut with respect to the primary apply lever and wherein the pivotal mounting of the primary apply lever with respect to the first threaded member and the pivotal mounting of the primary apply lever with respect to the first brake shoe are generally collinear with one another.

5. A brake as described in claim 1 wherein the pivotal connection into the secondary apply lever with the backing plate and a pivotal mounting of a secondary apply lever with respect to the strut and the pivotal mounting of the secondary apply lever with respect to the secondary brake shoe are generally collinear.

6. A brake as described in claim 1 wherein the first threaded member is a nut.

7. A brake as described in claim 1 wherein the second threaded member is a drive screw.

8. A duo-servo drum brake for a wheel of an automotive vehicle comprising:
 a brake drum for connection to the wheel;
 a backing plate for connection to the vehicle, the backing plate having an anchor at a first end;
 first and second brake shoes having means of mounting with the backing plate and having a pivotal mounting with respect to the anchor;
 a nonrotative nut mounted for linear motion with respect to the backing plate;
 a first apply lever pivotally mounted with respect to the nut and pivotally mounted with respect to the first brake shoe for imparting an actuation force to the first brake shoe and to receive an actuation force from the nut to effect both a service brake and a parking brake application,
 a second apply lever pivotally mounted with respect to the backing plate and also pivotally mounted with respect to the secondary brake shoe for imparting an actuation force to the second brake shoe to effect both a service brake and a parking brake application
 a generally fixed-length first strut for imparting an actuation force from the first lever to the second lever, the first strut having means of pivotal mounting with the first and second brake shoes, the first strut's pivotal mounting with the first brake shoe being on a line generally collinear with the pivotal mounting of the first apply lever with the nut and with the first shoe, and the pivotal mounting of the strut with respect to the second brake shoe being along a line collinear with the pivotal mounting of the second apply lever with the backing plate and with the second shoe;
 a second strut abuttingly engaged to the first and second shoes on an end of the first and second shoes opposite the anchor;
 a power screw threadably engaged with the nut for translating the nut;
 an electric motor torsionally associated with the power screw for turning the same; and
 means for preventing rotation of the power screw.

* * * * *